US012418821B2

(12) United States Patent
Spallaccini et al.

(10) Patent No.: US 12,418,821 B2
(45) Date of Patent: Sep. 16, 2025

(54) AWARENESS LAYERS FOR MANAGING ACCESS POINTS IN CENTRALIZED WIRELESS NETWORKS

(71) Applicant: HCL America Inc., Sunnyvale, CA (US)

(72) Inventors: Paolo Spallaccini, Vimodrone (IT); Yossi Altevet, Tel Aviv-Jaffa (IL); Irshad Pookunju, Minato (JP)

(73) Assignee: HCL America Inc.

( * ) Notice: Subject to any disclaimer, the term of this patent is extended or adjusted under 35 U.S.C. 154(b) by 546 days.

(21) Appl. No.: 17/833,929

(22) Filed: Jun. 7, 2022

(65) Prior Publication Data

US 2023/0397037 A1    Dec. 7, 2023

(51) Int. Cl.
*H04W 72/542*    (2023.01)
*H04W 28/02*    (2009.01)
*H04W 28/18*    (2009.01)

(52) U.S. Cl.
CPC ... *H04W 28/0236* (2013.01); *H04W 28/0268* (2013.01); *H04W 28/0278* (2013.01); *H04W 28/18* (2013.01); *H04W 72/542* (2023.01)

(58) Field of Classification Search
CPC ......... H04W 28/0236; H04W 28/0268; H04W 28/0278; H04W 28/18; H04W 72/542
See application file for complete search history.

(56) References Cited

U.S. PATENT DOCUMENTS

| | | |
|---|---|---|
| 8,559,410 B2 | 10/2013 | Kalika et al. |
| 9,351,197 B2 | 5/2016 | Yacovitch |
| 9,420,530 B1 | 8/2016 | Duxbury et al. |
| 10,708,126 B2 | 7/2020 | Singla et al. |
| 11,122,448 B2 | 9/2021 | Halabian et al. |
| 2017/0272317 A1* | 9/2017 | Singla ............... H04W 24/08 |
| 2020/0068440 A1* | 2/2020 | Talbert ............ H04L 41/5009 |
| 2020/0092172 A1* | 3/2020 | Kumaran ........... H04L 41/142 |
| 2024/0119300 A1* | 4/2024 | Terra ................... G06N 3/088 |

FOREIGN PATENT DOCUMENTS

| | | |
|---|---|---|
| EP | 1911201 B1 | 7/2018 |
| EP | 3114891 B1 | 3/2019 |
| WO | 2019106065 A1 | 6/2019 |

* cited by examiner

*Primary Examiner* — Mohammad S Adhami
*Assistant Examiner* — Andrew Chanul Kim
(74) *Attorney, Agent, or Firm* — Kendal M. Sheets (57) ABSTRACT

This disclosure relates to method and system for managing a plurality of access points in a centralized wireless network. The method includes installing one or more user space applications in each of the plurality of access points; receiving in real-time a plurality of Key Performance Indicators (KPIs) from each of the plurality of access points through the one or more user space applications; classifying in real-time, each of the plurality of access points into a set of administrative groups based on the plurality of KPIs; and for an access point in each of the set of administrative groups, generating a set of awareness layers corresponding to the access point based on the plurality of KPIs through the one or more user space applications. Each of the set of awareness layers is a data representation corresponding to one or more of the plurality of KPIs.

18 Claims, 6 Drawing Sheets

AWARENESS LAYERS FOR MANAGING ACCESS POINTS IN CENTRALIZED WIRELESS NETWORKS

TECHNICAL FIELD

This disclosure relates generally to wireless communication networks, and more particularly to awareness layers for managing a plurality of access points in a centralized wireless network through a central controller.

BACKGROUND

Wireless services delivered to areas covered by access points in a Wireless Local Area Network (WLAN) deployed as enterprise-level or public networks are typically in need for optimization of transmission medium usage efficiency, payload traffic maximization, and ease of command from control and management interfaces. Such needs arise primarily from a fierce contention in accessing physical transmission medium, often non-licensed and consequently, not intended for exclusive and regulated (planned) usage. As a result, there are sub-optimal levels of transmission performances and quality of services that are delivered, ultimately resulting in a limitation of end user experience that may be significant. In present state of art, methods for implementing closed-loop operations capable of delivering various forms of optimization to WLAN networks exist.

While 802.11 family standards (i.e., Wi-Fi), especially in latest "high efficiency" declinations (802.11AX), are actually targeting optimized strategies for granting fairness in medium accesses to client radios, still, space for bringing further optimization is huge and primarily achievable by leveraging on concepts such as self-organization or radio-resource management for nodes deployment. However, a limitation in size and topology of network or sub-network dimensions is a significantly limiting factor for such a solution. Additionally, such techniques lack flexibility in being able to freely scale and differentiate number of nodes or type and class of administered services, while also possessing significant scaling limitations after operations have started.

Further, existing solutions are deployed as 'black-boxes' (such solutions take decisions/actions without providing a rationale behind the decisions). This limitation intensifies over time when WLAN environments become more and more complex. Such solutions tend to become more sophisticated (e.g., based on an ML/AI algorithm), decreasing confidence level of a service provider in the solution, causing mistakes (i.e., wrong decisions) to be overlooked, and also hampering maintenance and debugging of the system when required.

The conventional technqiues fail to provide for methods to automatically manage access points in a network. There is, therefore, a need in the present state of art for techniques to intelligently manage access points in the network.

SUMMARY

In one embodiment, a method for managing a plurality of access points in a centralized wireless network is disclosed. In one example, the method includes installing, by a central controller of the wireless network, one or more user space applications in each of the plurality of access points through a lightweight communication protocol. The one or more user space applications are configured to establish a communication loop between each of the plurality of access points and the central controller. The method further includes receiving in real-time, by the central controller, a plurality of Key Performance Indicators (KPIs) from each of the plurality of access points through the one or more user space applications via the lightweight communication protocol. The method further includes classifying in real-time, by the central controller, each of the plurality of access points into a set of administrative groups based on the plurality of KPIs. Each of the set of administrative groups includes one or more access points For an access point in each of the set of administrative groups, the method further includes generating, by the central controller, a set of awareness layers corresponding to the access point based on the plurality of KPIs through the one or more user space applications. Each of the set of awareness layers is a data representation corresponding to one or more of the plurality of KPIs. Each of the set of awareness layers includes comprehensive awareness information based on the one or more of the plurality of KPIs. For an access point in each of the set of administrative groups, the method further includes generating, by the central controller, a list of network driving actions corresponding to the access point based on the comprehensive awareness information of the set of awareness layers. For an access point in each of the set of administrative groups, the method further includes determining, by the central controller, a list of guiding criteria associated with each of the list of network driving actions in a user comprehensible format through an Explainable Artificial Intelligence (XAI) model.

In one embodiment, a system for managing a plurality of access points in a centralized wireless network is disclosed. In one example, the system includes a processor and a computer-readable medium communicatively coupled to the processor. The computer-readable medium store processor-executable instructions, which, on execution, cause the processor to install one or more user space applications in each of the plurality of access points through a lightweight communication protocol. The one or more user space applications are configured to establish a communication loop between each of the plurality of access points and the central controller. The processor-executable instructions, on execution, further cause the processor to receive in real-time a plurality of KPIs from each of the plurality of access points through the one or more user space applications via the lightweight communication protocol. The processor-executable instructions, on execution, further cause the processor to classify in real-time each of the plurality of access points into a set of administrative groups based on the plurality of KPIs. Each of the set of administrative groups includes one or more access points. For an access point in each of the set of administrative groups, the processor-executable instructions, on execution, further cause the processor to generate a set of awareness layers corresponding to the access point based on the plurality of KPIs through the one or more user space applications. Each of the set of awareness layers is a data representation corresponding to one or more of the plurality of KPIs. Each of the set of awareness layers includes comprehensive awareness information based on the one or more of the plurality of KPIs. For an access point in each of the set of administrative groups, the processor-executable instructions, on execution, further cause the processor to generate a list of network driving actions corresponding to the access point based on the comprehensive awareness information of the set of awareness layers. For an access point in each of the set of administrative groups, the processor-executable instructions, on execution, further cause the processor to determine a list of guiding criteria associated with each of the list of network driving actions in a user comprehensible format through an XAI model.

In one embodiment, a central controller of a wireless network for managing a plurality of access points in a centralized wireless network is disclosed. In one example, the central controller is configured to perform operations including installing, by a central controller of the wireless network, one or more user space applications in each of the plurality of access points through a lightweight communication protocol. The one or more user space applications are configured to establish a communication loop between each of the plurality of access points and the central controller. The operations further include receiving in real-time a plurality of KPIs from each of the plurality of access points through the one or more user space applications via the lightweight communication protocol. The operations further include classifying in real-time each of the plurality of access points into a set of administrative groups based on the plurality of KPIs. Each of the set of administrative groups includes one or more access points. For an access point in each of the set of administrative groups, the operations further include generating a set of awareness layers corresponding to the access point based on the plurality of KPIs through the one or more user space applications. Each of the set of awareness layers is a data representation corresponding to one or more of the plurality of KPIs. Each of the set of awareness layers includes comprehensive awareness information based on the one or more of the plurality of KPIs. For an access point in each of the set of administrative groups, the operations further include generating a list of network driving actions corresponding to the access point based on the comprehensive awareness information of the set of awareness layers. For an access point in each of the set of administrative groups, the operations further include determining a list of guiding criteria associated with each of the list of network driving actions in a user comprehensible format through an XAI model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Further, the phrases "in some embodiments," "in accordance with some embodiments," "in the embodiments shown," "in other embodiments," and the like generally mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered as exemplary only, with the true scope and spirit being indicated by the following claims.

Figure 1:
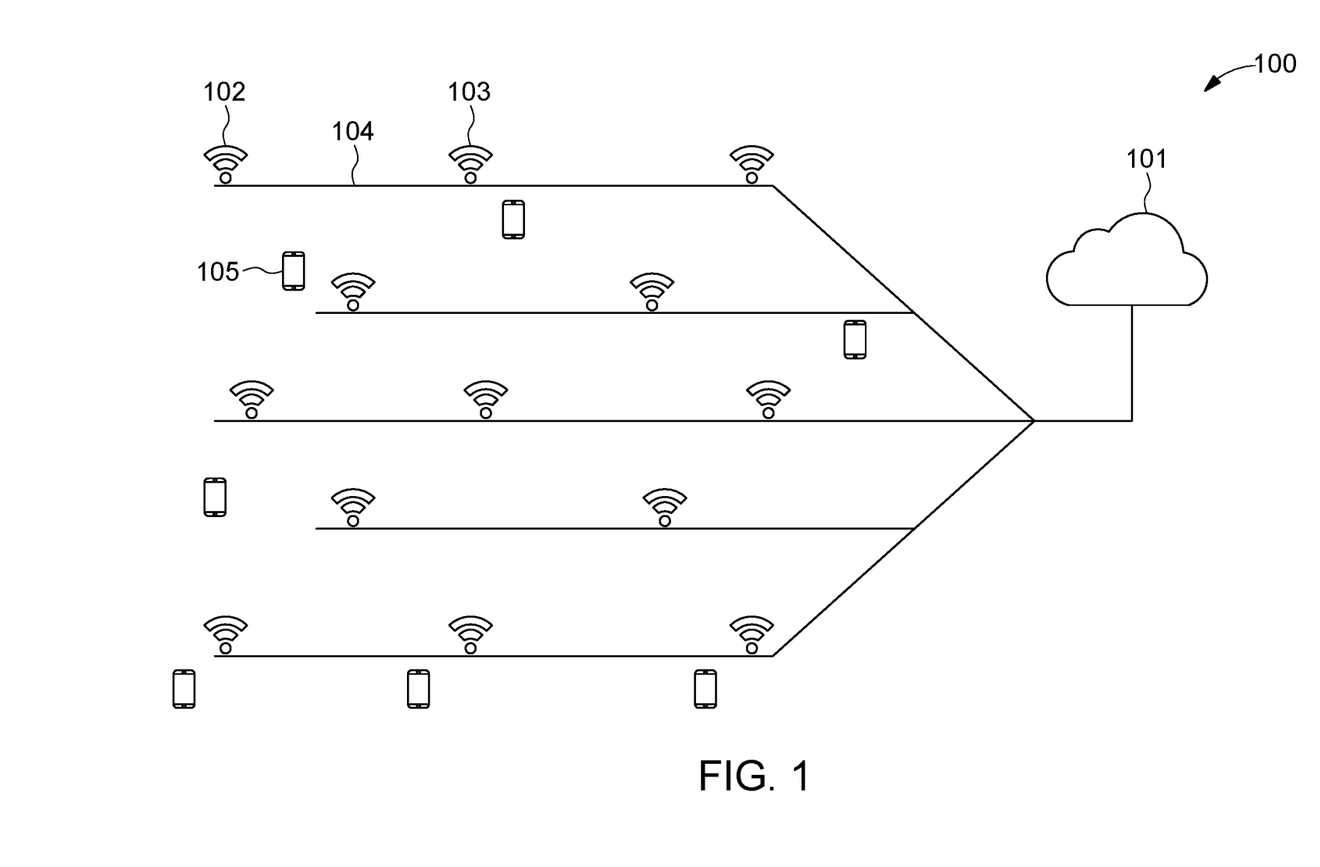
FIG. 1 illustrates an exemplary wireless communication network where various embodiments may be employed.

Referring now to FIG. 1, an exemplary centralized wireless communication network 100 (also referred to herein as network 100) where various embodiments may be employed, is illustrated. By way of an example, the network 100 may be a cell phone network, a satellite communication network, a terrestrial microwave network, a Wireless Local Area Network (WLAN), a wireless sensor network, or the like. The network 100 includes a central controller 101 directly or indirectly communicably coupled with each of a plurality of access points (such as, an access point 102 and an access point 103) through a network backbone 104 (for example, an ethernet backbone or a wireless backbone) forming a star topology.

It should be noted that the central controller 101 is a cloud-based entity. Each of the plurality of access points communicates with the central controller 101 through a lightweight communication protocol (for example, MQTT, CoAP, Lightweight Directory Access Protocol (LDAP), Lightweight Extensible Authentication Protocol (LEAP), Lightweight Presentation Protocol (LPP), Internet Content Adaptation Protocol (ICAP), Skinny Client Control Protocol (SCCP), OpenLDAP, etc.).

Further, the network 100 includes a set of administrative groups formed by the central controller 101. It may be noted that an administrative group is a sub-network at a logical level that includes one or more of the plurality of access points communicatively coupled with the central controller 101. In some embodiments, a dedicated central node within the central controller communicates and manages the one or more of the plurality of access points of the administrative group. The one or more of the plurality of access points in an administrative group may share common sub-network ownership and administration via the central controller 101. The central node is a logical entity coincident with the central controller 101 that is dedicated to implement all the centralized operations for an administrative group. Only logical identifiers may allow distinctions between access points in same or different administrative groups.

Further, the network 100 includes a plurality of client devices (such as, a client device 105). By way of an example, the client device 105 may be a computing device (for example, a desktop, a laptop, a server, a notebook, a netbook, a tablet, a smartphone, a mobile phone, or the like) or any additional device providing network compatibility (for example, a dongle, a Li-Fi sleeve, or the like) to a computing device. Each of the plurality of client devices is configured to exchange data with one of the plurality of access points in the network 100. For example, the client device 105 exchanges data with the access point 102.

It should be noted that the central controller 101 is implemented over a cloud server, in accordance with some embodiments of the present disclosure. The central controller 101 receives a plurality of Key Performance Indicators (KPIs) from each of the plurality of access points and the plurality of client devices in real-time. Further, the central controller 101 generates a set of awareness layers based on the plurality of KPIs and determines a list of network driving actions and a corresponding list of guiding criteria for each of the plurality of access points in the network 100.

As will be described in greater detail in conjunction with FIGS. 2-5, the central controller 101 installs one or more user space applications in each of the plurality of access points through a lightweight communication protocol. The one or more user space applications are configured to establish a communication loop between each of the plurality of access points and the central controller 101. The central controller 101 further receives in real-time, a plurality of KPIs from each of the plurality of access points through the one or more user space applications via the lightweight communication protocol. The central controller 101 further classifies in real-time, each of the plurality of access points into a set of administrative groups based on the plurality of KPIs. Each of the set of administrative groups includes one or more access points. For an access point in each of the set of administrative groups, the central controller 101 further generates a set of awareness layers corresponding to the access point based on the plurality of KPIs through the one or more user space applications. It may be noted that most information is elaborated in a "near real-time" manner while other information may be processed not necessarily in "near real-time". The set of awareness layers is generated and kept up-to-date with a reasonable time latency. Each of the set of awareness layers is a data representation corresponding to one or more of the plurality of KPIs. Each of the set of awareness layers includes comprehensive awareness information based on the one or more of the plurality of KPIs. For an access point in each of the set of administrative groups, the central controller 101 further generates a list of network driving actions corresponding to the access point based on the comprehensive awareness information of the set of awareness layers. For an access point in each of the set of administrative groups, the central controller 101 further determines a list of guiding criteria associated with each of the list of network driving actions in a user comprehensible format through an Explainable Artificial Intelligence (XAI) model.

In some embodiments, new access points can be dynamically added to an administrative group at a time of creation of the administrative group or when the network 100 is implementing one or more operations in accordance with some embodiments of the present disclosure. Similarly, an access point can be dynamically removed from an administrative group. Further, new administrative groups can be created in the network 100 at a time of creation of the network 100 or when the network 100 is implementing one or more operations in accordance with some embodiments of the present disclosure. Therefore, it should be noted that the network 100 is a scalable network capable of managing any number of administrative groups through the central controller 101.

Figure 2:
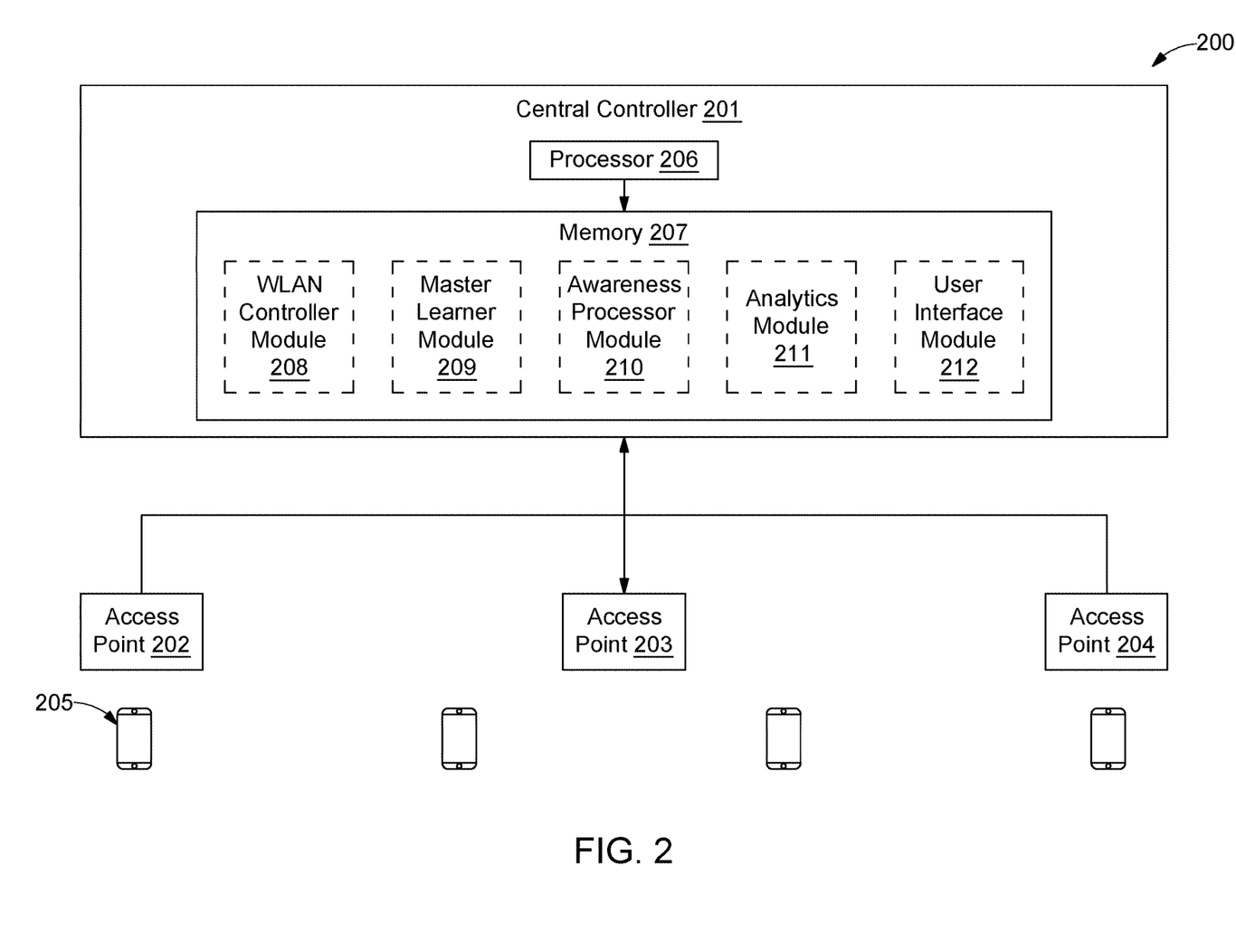
FIG. 2 illustrates a block diagram of an exemplary system for managing a plurality of access points in a centralized wireless network, in accordance with some embodiments of the present disclosure.

Referring now to FIG. 2, an exemplary system 200 for managing a plurality of access points in a centralized wireless network is illustrated, in accordance with some embodiments of the present disclosure. The system 200 includes a central controller 201 connected to an access point 202, an access point 203, and an access point 204 through a lightweight communication protocol in a star topology similar to the network 100. Further, the system 200 includes a plurality of client devices (for example, a client device 205). The central controller 201 is analogous to the central controller 101 and the client device 205 is analogous to the client device 105 of the network 100. Further, each of the plurality of access points 202, 203, and 204 is analogous to any of the access points 102 and 103 of the network 100.

Each of the central controller 201 and the access points 202, 203, and 204 in the network 200 includes one or more processors and a memory. For ease of explanation, only the central controller 201 is depicted as including a processor 206 and a memory 207. Additionally, the central controller 201 is implemented over a cloud server, in accordance with some embodiments of the present disclosure. Further, the memory 207 stores instructions that, when executed by the processor 206, cause the processor 206 to manage the plurality of access points in the system 200 by generating a set of awareness layers in each of the plurality of access points. The memory 207 also stores various data (for example, the plurality of KPIs, the set of awareness layers, the list of network driving actions, the corresponding list of guiding criteria and the like) that may be captured, processed, and/or required by the central controller 201.

The central processor 201 further includes, within the memory 207, a WLAN controller module 208, a master learner module 209, an awareness processor module 210, an analytics module 211, and a User Interface (UI) module 212. The WLAN controller module 208 establishes a separate communication channel with each of the plurality of access points 202, 203, 205, and 206 for management plane over the internet through the lightweight communication protocol. Additionally, the WLAN controller module 208 provides a capability of provisioning and dynamically configuring each of the plurality of access points 202, 203, 205, and 206 through an appropriate lightweight communication protocol established on top of management channel.

The WLAN controller module 208 installs one or more user space applications in each of the plurality of access points 202, 203, 205, and 206 through the lightweight communication protocol. It should be noted that the one or more user space applications are installed over an Operating System (OS) of each of the plurality of access points 202, 203, 205, and 206. The one or more user space applications are configured to establish a communication loop between each of the plurality of access points 202, 203, 205, and 206 and the central controller 201. Further, the one or more user space applications are configured to collect a plurality of KPIs from each of the plurality of access points 202, 203, 205, and 206 in real-time. Further, the central controller 201 receives in real-time, a plurality of KPIs from each of the plurality of access points through the one or more user space applications via the lightweight communication protocol.

Further, the master learner module 209 classifies each of the plurality of access points 202, 203, 205, and 206 into a set of administrative groups based on the plurality of KPIs. Each of the set of administrative groups includes one or more access points managed by a dedicated central node in the central controller 201. The master learner module 209 may dynamically add or remove an access point from an administrative group based on the plurality of KPIs corresponding to the access point or to at least one access point from the administrative group.

Further, the awareness processor module 210 generates a set of awareness layers corresponding to an access point (such as, the access point 202) based on the plurality of KPIs through the one or more user space applications. Each of the set of awareness layers is a data representation corresponding to one or more of the plurality of KPIs. In some embodiments, the one or more of the plurality of KPIs are selected by a user operating the central controller 201. Each of the set of awareness layers includes comprehensive awareness information based on the one or more of the plurality of KPIs. By way of an example, the set of awareness layers includes a proprietary transmission awareness layer, an interferent transmission awareness layer, a traffic distribution fairness awareness layer, and a user experience awareness layer. It must be noted that the comprehensive awareness information of each of the set of awareness layers can be measured, elaborated, or inferred by the analytics module 211.

Further, the awareness processor module 210 elaborates the comprehensive awareness information of each of the set of awareness layers. The awareness processor module 210 processes, structures, and stores the comprehensive awareness information in appropriate databases that may be correlated with WLAN deployment descriptors, such as, but not limited to, position of access points, configuration and traffic serving capabilities, members of each of the set of administrative groups, and type of services offered.

In an embodiment, the awareness processor module 210 constructs four awareness layers. The awareness layers are constructed through other dedicated computer services that run on the awareness processor module 210. Such computer services collect the plurality of KPIs and any other measurement that may be required, from each of the one or more user space applications running on the access point 202. Data processing services in the awareness processor module 210 are organized in form of a computing architecture. The computing architecture further includes services for batching data and storing processed data alongside services for scalability and appropriate redundancy.

In some embodiments, data processing services for each of the set of awareness layers target production of appropriate interactive data representations in form of awareness maps and awareness tables covering entire span of area covered by the set of administration groups in the system 200, irrespective of actual geographical span of the system 200 or of number of access points in the system 200. Further, the awareness maps are organized and visualized through UIs that are also conceived and realized to be interactive in order to effectively represent awareness information and to grant appropriate configuration and sub-networks interaction capabilities to the user.

The awareness maps and the awareness tables corresponding to the set of awareness layers are organized to include proprietary transmission awareness, interference transmission awareness, traffic distribution fairness awareness, and user experience awareness.

In an embodiment, the proprietary transmission awareness includes 802.11 signal strength view or representation built on the entire span of the area covered by the set of administration groups based on spectrum sensing per radio band (PHY awareness on known emitters).

In an embodiment, the interference transmission awareness includes foreign radio signals view or representation based on appropriate sensors or capabilities of same access point to sense spectrum for waveforms other than 802.11 emission (for example, PHY interferers detection and classification). In an embodiment, a foreign radio signal includes 802.11 compliant emissions that do not originate from access points belonging to any of the set of administrative groups (rogue 802.11 nodes).

Further, in an embodiment, the traffic distribution fairness awareness includes assessment of fairness of access point traffic distribution among the plurality of client devices within a coverage area of an administrative group. Further, assessment is shown in form of a visual representation. A traffic density view or representation across geographical area covered by the set of administration group of the system 200 is also given. In an embodiment, the traffic density view or representation includes a representation of location indication or positioning estimations for connected client devices, activity status, and amount of average and peak traffic per radio resource.

Further, in an embodiment, user experience awareness includes quality assessments on efficiency and fairness of physical medium accesses, by monitoring user airtime usage and user opportunities. The quality assessment is provided in form of a view or representation across the entire span covered by the set of administrative groups.

Further, the analytics module 211 generates a list of network driving actions corresponding to the access point 202 based on the comprehensive awareness information of the set of awareness layers.

Further, the analytics module 211 determines a list of guiding criteria associated with each of the list of network driving actions in a user comprehensible format through an XAI model. The analytics module 211 initiates computer services for processing and providing rationale (in form of the list of guiding criteria) corresponding to each of the list of network driving actions. In some embodiments, the rationale is provided in a convenient form or formalism (measurable or descriptive) in order to develop and grow cognitive capabilities overseeing evolution of operations of the system 200 via the XAI model.

The analytics module 211 further introduces computer services that derive information from the data and performance awareness provided by the set of awareness layers corresponding to access points in each of the set of administration groups. Further, the computer services automatically interact with WLAN nodes in order to alter the network behavior of an administrative group in an orchestrated fashion.

The analytics module 211 determines radio proximity relationships based on mutual Received Signal Strength Indicator (RSSI) levels, by discovering various coverage area layers (or tiers) for each of the plurality of access points. It may be noted that at least 4 coverage area tiers are discovered for each of the plurality of access points. It should be noted that a dedicated computer service is devoted to detect and update the radio proximity relationships between access points (for example, in RF clusters) in a non real-time manner, at a predefined update frequency (e.g., 15 minutes, a frequency in an order of near-real-time, or the like). It should also be noted that radio proximity relationships are in any case limited within boundaries of the set of administrative groups.

Further, the analytics module 211 determines quality of end user experience and quality of delivered radio service assessments. A dedicated computer service determines a quantitative scoring assigned to percentage of end user airtime with respect to access point limits and end user equipment limits (for example, the quantitative scoring assigned to fitness optimality of end user airtime with respect to requirements of major applications). The dedicated computer service also determines quantitative scoring assigned to effectiveness of radio coverage measured in terms of optimal diversification of radio frequencies used, optimized beamforming, and span of 802.11 radio signal for each of the plurality of access points. Further, the dedicated computer service, driven by assessed quantitative scorings, interacts directly with the plurality of access points to implement a control loop targeting a continuous scorings optimization.

Further, the analytics module 211 determines frequency allocation overlaps between the plurality of access points in neighboring coverage areas. A dedicated computer service ensures optimization of frequency allocation across RF clusters by nullifying or minimizing frequency overlaps. The dedicated computer service implements a dynamic channel allocation feature for a general objective of optimizing WLAN deployment performance.

Further, the analytics module 211 determines transmit power impairments for individual access points and an automatically selected cluster of access points. A dedicated computer service ensures detection of TX power impairments and sets a new target TX power in accordance with selected objectives (such as, optimization of RF coverage areas and restoration of planned coverage).

Further, the analytics module 211 determines dynamic evolutions of intended signal coverage areas. A dedicated computer service ensures detection of changes in propagation conditions that cause poor client service or experience due to diminished RF coverage. The dedicated computer service connects with 802.11 and foreign emission awareness layers and with quality of radio service and experience awareness layers to identify reasons for decrease in assessed quality of delivered services and experience. Further, the dedicated computer service interacts with a TX power impairments recovery service for providing countermeasures. The dedicated computer service interacts with quality of radio service and experience awareness layers to drive coverage optimization into scorings optimization control loop.

Further, the analytics module 211 identifies client positioning information and dynamic evolution of connection to access points to determine payload traffic balance for each access point assessment.

Further, the analytics module 211 determines traffic overloading condition and opportunities for rebalancing clients across nodes. A dedicated computer service ensures monitoring traffic load distribution across nodes in the RF cluster with respect to expected traffic capacity at a given point in time. The dedicated computer service controls client connections by selecting client candidate.

Further, the WLC controller module 208 of the central controller 201 interacts with the system 200 to alter network composition and network behavior. Thus, the system 200 is a self-driving network. Further, the central controller 201 introduces other computer services leveraging on self-awareness to build and grow cognitive abilities on top of self-driving potential. Such computer services are conceived to take as input selected data collected from the set of awareness layers and appropriate feedback paths to process two separate output lines, namely, self-driving actions and rationale.

Self-driving actions may be induced by application of learning methods or of behavioral models, in form of list of network driving actions. The output line providing the list of network driving actions is routed towards intended targets. In an embodiment, the intended targets are the plurality of access points in the system 200. Alternately, the intended targets are other computer services that are part of the WLAN controller module 208.

Rationale behind each of the list of network driving actions, in form of a list of guiding criteria, is represented in measurable format or in descriptive and formatted formats (e.g., JSON file with given schema) enabling human comprehension to improve quality of interaction with the system 200. Output line providing the list of guiding criteria is redirected as feedback path for the computer service input and routed to a different computer service performing further automatic analytics duties. The output line is also directed to a separate computer service which analyses each of the list of guiding criteria, selects appropriate guiding criteria, and prepares one or more user action options. The one or more user action options are ultimately presented to network administrator as optional or mandatory choices of network optimization through a GUI.

The analytics module 211 implements algorithms that process input data (such as, the plurality of KPIs) collected from the plurality of access points in order to determine the list of network driving actions to be applied to automatically selected access points for closed-loop WLAN deployment operating conditions optimization and performance maximization.

Further, the WLAN controller module 208 organizes the centralized engine computer services of the awareness processor module 210 to act in synergy with the WLAN controller module 208 for controlling the set of administrative groups and, in particular, to ensure scalability for network administration and appropriate segregation of delivered services and security levels.

The UI module 212 renders the one or more user action options on a Graphical User Interface (GUI) via a display (not shown in figure) for a user to interact with the central controller 201. The system 200 also includes one or more external devices (not shown in figure). In some embodiments, the central controller 201 interacts with the one or more external devices over a communication network for sending or receiving various data. The external devices include, but may not be limited to, a remote server, a digital device, or another computing system.

In some embodiments, the central controller 201 further exposes and controls some of available data, developed features, and capabilities through external services and management systems that can access such exposed interfaces. In such embodiments, dedicated Application Programming Interfaces (APIs) are made available in appropriate formats and standards through secured connections, (e.g. RESTful APIs through HTTPS connections).

As will be appreciated by a person skilled in the art, explanation of functioning of the above mentioned modules use the access point 202 as an illustrative example for simplicity of explanation and the said functioning can apply to any of the plurality of access points or a central node of any of the set of administrative groups in the system 200.

It should be noted that all such aforementioned modules 208-212 may be represented as a single module or a combination of different modules. Further, as will be appreciated by those skilled in the art, each of the modules 208-212 may reside, in whole or in parts, on one device or multiple devices in communication with each other. In some embodiments, each of the modules 208-212 may be implemented as dedicated hardware circuit comprising custom application-specific integrated circuit (ASIC) or gate arrays, off-the-shelf semiconductors such as logic chips, transistors, or other discrete components. Each of the modules 208-212 may also be implemented in a programmable hardware device such as a field programmable gate array (FPGA), programmable array logic, programmable logic device, and so forth. Alternatively, each of the modules 208-212 may be implemented in software for execution by various types of processors (e.g., processor 206). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing a plurality of access points in a centralized wireless network. For example, the exemplary network 100 and the associated central controller 101 may manage a plurality of access points by the processes discussed herein. In particular, as will be appreciated by those of ordinary skill in the art, control logic and/or automated routines for performing the techniques and steps described herein may be implemented by the network 100 and the associated central controller 101 either by hardware, software, or combinations of hardware and software. For example, suitable code may be accessed and executed by the one or more processors on the network 100 to perform some or all of the techniques described herein. Similarly, application specific integrated circuits (ASICs) configured to perform some or all of the processes described herein may be included in the one or more processors on the network 100.

Figure 3:
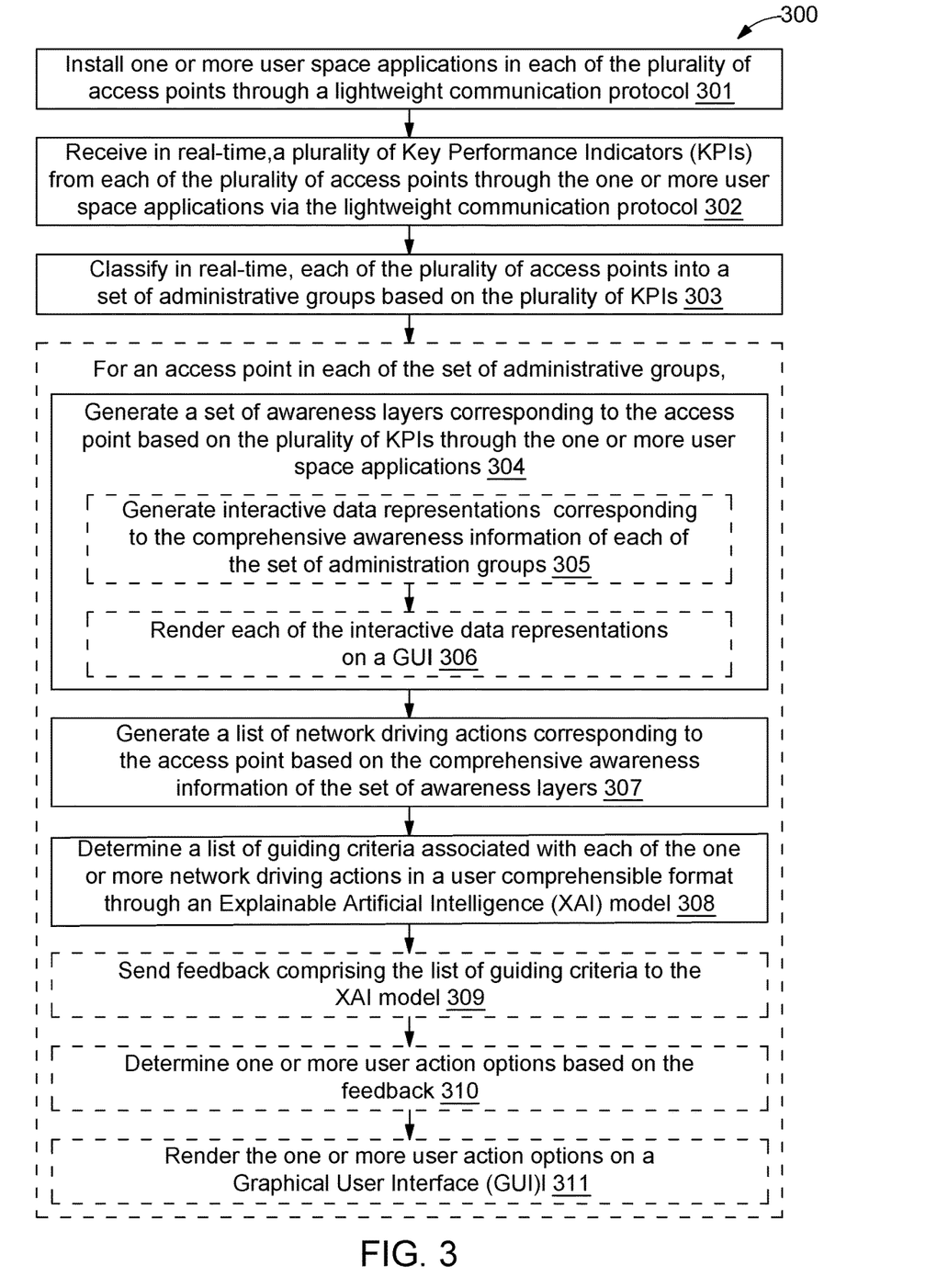
FIG. 3 illustrates a flow diagram of an exemplary control logic for managing a plurality of access points in a centralized wireless network, in accordance with some embodiments of the present disclosure.

Referring now to FIGS. 3, an exemplary control logic 300 for managing a plurality of access points in a centralized wireless network is disclosed via a flowchart, in accordance with some embodiments of the present disclosure. In an embodiment, the control logic 300 is implemented by a system, such as the system 200 or the central controller 201. As illustrated in the flowchart, the control logic 300 includes installing, by a WLAN controller module of a central controller (for example, the WLAN controller module 208 of the central controller 201) of the wireless network, one or more user space applications in each of the plurality of access points through a lightweight communication protocol, at step 301. The one or more user space applications are configured to establish a communication loop between each of the plurality of access points and the central controller.

The control logic 300 further includes receiving in real-time, by the WLC controller module 208, a plurality of KPIs from each of the plurality of access points through the one or more user space applications via the lightweight communication protocol, at step 302.

The control logic 300 further includes classifying in real-time, by the master learner module 209, each of the plurality of access points into a set of administrative groups based on the plurality of KPIs 303. Each of the set of administrative groups includes one or more access points.

In some embodiments, the control logic 300 includes dynamically adding or removing an access point from the plurality of access points from one of the set of administrative groups based on the plurality of KPIs corresponding to one of the access point or at least one access point from the one of the set of administrative groups. In some embodiments, the control logic 300 includes dynamically creating a new administrative group including one or more access points of the wireless network communicatively coupled with a central node, based on the plurality of KPIs corresponding to each of the one or more access points.

For an access point in each of the set of administrative groups, the control logic 300 further includes generating, by the awareness processor module 210, a set of awareness layers corresponding to the access point based on the plurality of KPIs through the one or more user space applications, at step 304. Each of the set of awareness layers is a data representation corresponding to one or more of the plurality of KPIs. Each of the set of awareness layers includes comprehensive awareness information based on the one or more of the plurality of KPIs. By way of an example, the set of awareness layers includes a proprietary transmission awareness layer, an interferent transmission awareness layer, a traffic distribution fairness awareness layer, and a user experience awareness layer.

In some embodiments, to generate a set of awareness layers corresponding to the access point, the control logic 300 further includes generating interactive data representations corresponding to the comprehensive awareness information of each of the set of administration groups, at step 305. In such embodiments, the control logic 300 further includes rendering each of the interactive data representations on a GUI, at step 306.

For an access point in each of the set of administrative groups, the control logic 300 further includes generating, by the analytics module 211, a list of network driving actions corresponding to the access point based on the comprehensive awareness information of the set of awareness layers, at step 307. In some embodiments, the control logic 300 includes sending the generated list of network driving actions to the associated access point or to a selected group of associated access points.

For an access point in each of the set of administrative groups, the control logic 300 further includes determining, by the analytics module 211, a list of guiding criteria associated with each of the list of network driving actions in a user comprehensible format through an XAI model, at step 308.

In some embodiments, for an access point in each of the set of administrative groups, the control logic 300 further includes sending feedback including the list of guiding criteria to the XAI model, at step 309. In such embodiments, the control logic 300 further includes determining, by the analytics module 211, one or more user action options based on the feedback, at step 310. In such embodiments, the control logic 300 further includes rendering, by the UI module 212, the one or more user action options on a GUI, at step 311.

In some embodiments, the control logic 300 includes generating interactive data representations corresponding to the comprehensive awareness information of each of the set of administration groups. In such embodiments, the control logic 300 includes rendering each of the interactive data representations on a GUI. Also, in some embodiments, the control logic 300 includes computing secondary information based on the comprehensive awareness information from one or more of the set of awareness layers corresponding to each of the set of administration groups. In such embodiments, the control logic 300 includes automatically managing network behavior of at least one of the set of administration groups through an interaction with the associated access point.

Figure 4:
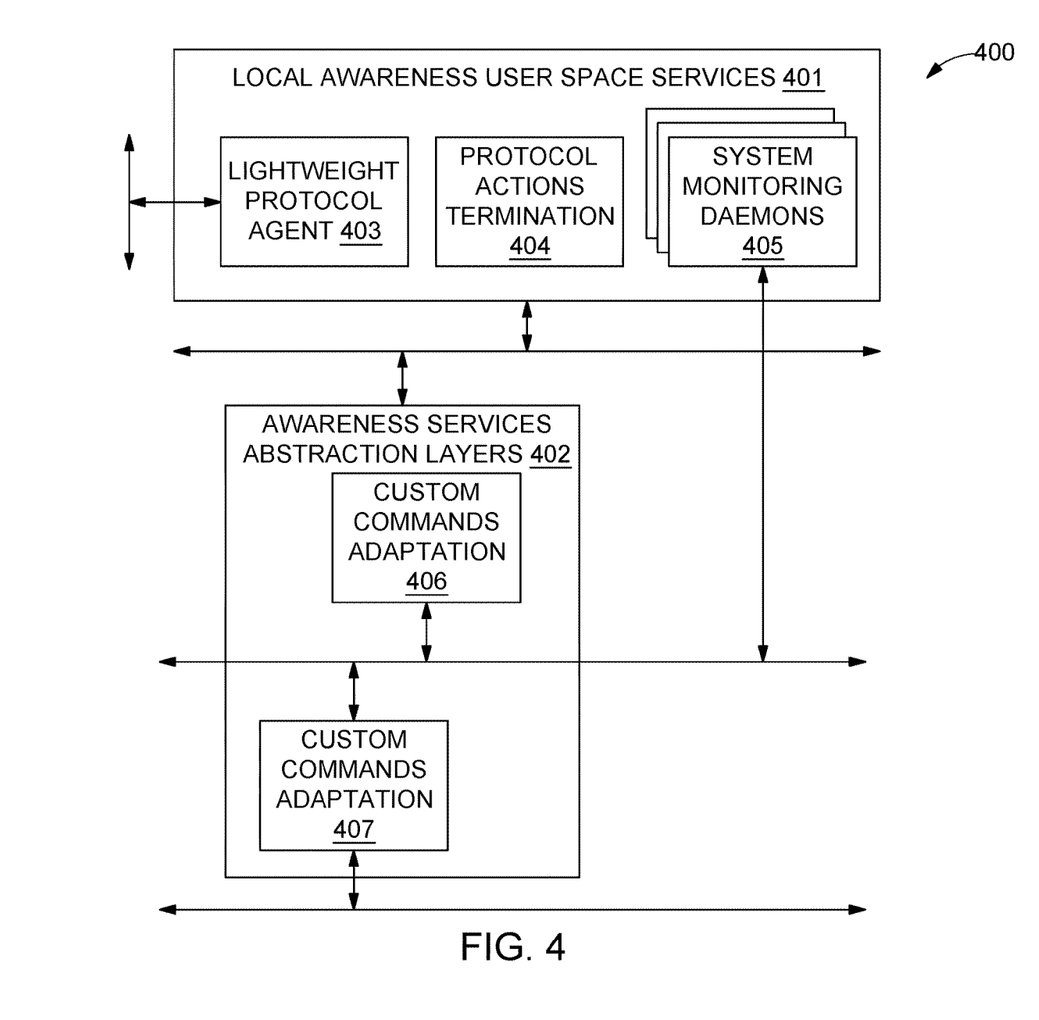
FIG. 4 illustrates a block diagram of an exemplary communication plane of an access point, in accordance with some embodiments of the present disclosure.

Referring now to FIG. 4, an exemplary communication plane 400 of an access point (for example, the access point 202) is illustrated, in accordance with some embodiments of the present disclosure. The communication plane 400 includes local awareness user space services 401 and awareness services abstraction layers 402. The local awareness user space services 401 further include lightweight protocol agent 403, protocol actions termination module 404, and system monitoring daemons 405. It may be noted that the local awareness user space services 401 correspond to the one or more user space applications installed in the access point by the WLC controller module 208 of the central controller 201. The awareness services abstraction layers 402 further include custom commands adaptation module 406 and custom commands adaptation module 407.

The local awareness user space services 401 collect the plurality of KPIs that may be processed by the awareness processor module 210 to generate the set of awareness layers. The awareness services abstraction layers 402 include the set of awareness layers of the access point. This has been explained in detail in conjunction with FIG. 2.

Figure 5:
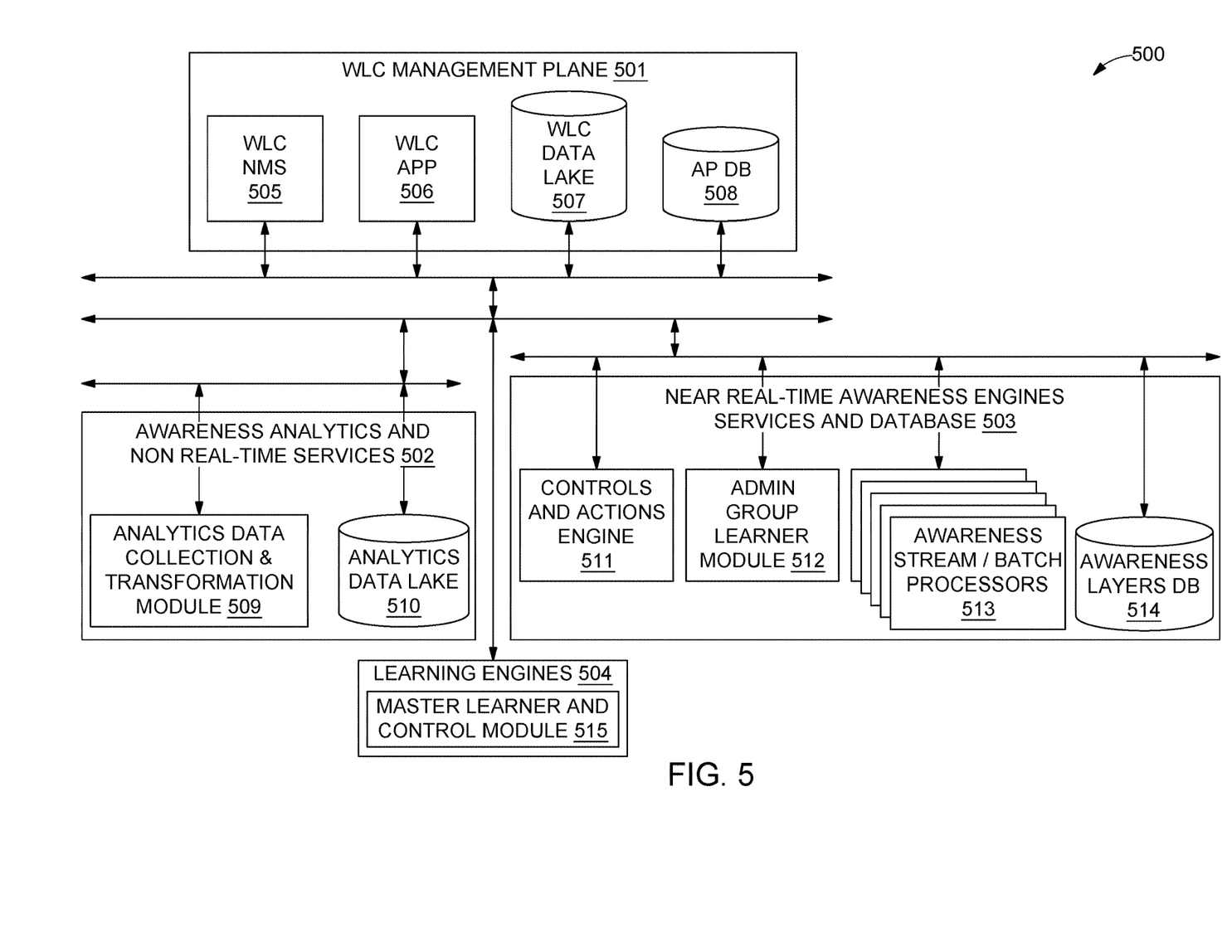
FIG. 5 illustrates a block diagram of an exemplary management plane of an access point, in accordance with some embodiments of the present disclosure.

Referring now to FIG. 5, an exemplary management plane 500 of an access point (for example, the access point 202) is illustrated, in accordance with some embodiments of the present disclosure. The management plane 500 includes a WLC management plane 501, awareness analytics and non real-time services 502, near real-time awareness engines services and database 503, and learning engines 504. The WLC management plane 501 further includes WLC Network Management System (NMS) 505, WLC app 506, WLC data lake 507, and access point database 508. In an embodiment, the WLC management plane 501 communicates with the WLC controller module 208 of the central controller 201. In such an embodiment, the WLC management plane 501 receives the network driving actions and the list of guiding criteria from the WLC controller module 208.

The awareness analytics and non real-time services 502 further include analytics data collection & transformation module 509 and analytics data lake 510. The near real-time awareness engines services and database 503 includes controls and actions engine 511, admin group learner module 512, awareness stream/batch processors 513, and awareness layers database 514. The learning engines 504 include master learner and control module 515. This has been explained in detail in conjunction with FIG. 2.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
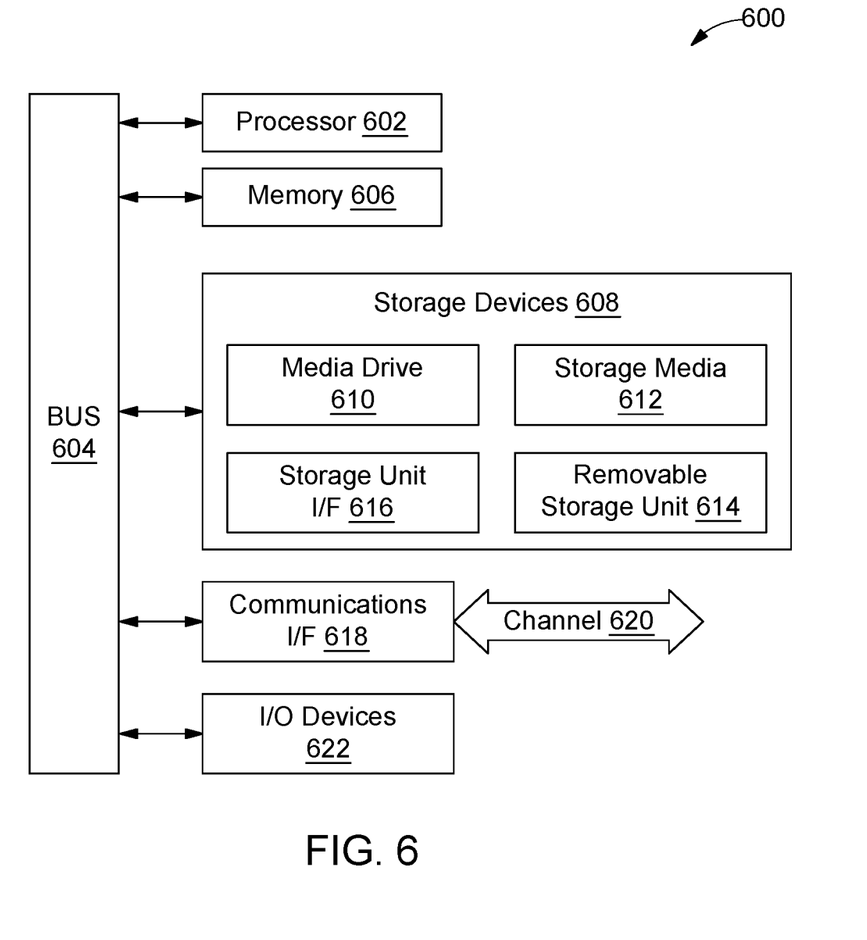
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 602 that may be implemented using a general or special purpose processing engine such as, for example, a microprocessor, microcontroller or other control logic. In this example, the processor 602 is connected to a bus 604 or other communication medium. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. The memory 606 also may be used for storing temporary variables or other intermediate information during execution of instructions to be executed by the processor 602. The computing system 600 may likewise include a read only memory ("ROM") or other static storage device coupled to bus 604 for storing static information and instructions for the processor 602.

The computing system 600 may also include a storage device [604] 608, which may include, for example, a media drives 610 and a removable storage interface. The media drive 610 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 612 may include, for example, a hard disk, magnetic tape, flash drive, or other fixed or removable medium that is read by and written to by the media drive 610. As these examples illustrate, the storage media 612 may include a computer-readable storage medium having stored there in particular computer software or data.

In alternative embodiments, the storage devices 608 may include other similar instrumentalities for allowing computer programs or other instructions or data to be loaded into the computing system 600. Such instrumentalities may include, for example, a removable storage unit 614 and a storage unit interface 616, such as a program cartridge and cartridge interface, a removable memory (for example, a flash memory or other removable memory module) and memory slot, and other removable storage units and interfaces that allow software and data to be transferred from the removable storage unit 614 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via a channel 620. The channel 620 may carry signals and may be implemented using a wireless medium, wire or cable, fiber optics, or other communications medium. Some examples of the channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and also display an output of the computation performed by the processor 602. In this document, the terms "computer program product" and "computer-readable medium" may be used generally to refer to media such as, for example, the memory 606, the storage devices 608, the removable storage unit 614, or signal(s) on the channel 620. These and other forms of computer-readable media may be involved in providing one or more sequences of one or more instructions to the processor 602 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 614, the media drive 610 or the communications interface 618. The control logic (in this example, software instructions or computer program code), when executed by the processor 602, causes the processor 602 to perform the functions of the invention as described herein.

Thus, the disclosed method and system try to overcome the technical problem of managing a plurality of access points in a centralized wireless network. The method and system provide an appealing customization of services through change of network administration paradigm and perspective, bringing user-centricity for delivered services. The method and system further provide flexibility in dynamically handing the network with added cognitive capabilities. Besides improvements delivered to users, the method and system are also able to tune the network for full control of cost of ownership. The method and system further provide a capability of segmenting services and related quality, ranging from small to large and very large deployments that widens the set of fields of application by a large extent. Further, the architecture is highly scalable and can grow to any dimension. Addition, deletion, or modification of an access point is made in a flexible manner considering all scalability aspects such as load balancing of a self-organizing network (SON) cloud controller, communication channel between SON agent running on the access point and the SON cloud controller, data lake architecture, etc. The architecture of the solution has been conceived to expose services to external users. SON use-cases for LTE and 5G network can thus be synergically leveraged for realization of inter-RATs handover enabling heterogeneous radio technologies and multi-tier accesses. Further, capabilities of optimization of usage of any PHY resource and MAC configuration concur at minimizing network administrator OPEX. Additionally, portability of access point SW and cloud-based deployment for centralized services combined with appropriate architectural choices on embodiments of the invention allow flexible expansions of the contents as well as vertical and horizontal scalability of a solution that is virtually agnostic with respect to HW platforms on which it is implemented, for best control and minimization of CAPEX-OPEX balance. Further, the method and system provide easy for monitoring and maintenance of most of the possible embodiments, especially when such expenditure (OPEX) is put in relationships with the number of users benefitting from the solution.

As will be appreciated by those skilled in the art, the techniques described in the various embodiments discussed above are not routine, or conventional, or well understood in the art.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for managing a plurality of access points in a centralized wireless network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing a plurality of access points in a centralized wireless network, the method comprising:
installing, by a central controller of the wireless network, one or more user space applications in each of the plurality of access points through a lightweight communication protocol, wherein the one or more user space applications are configured to establish a communication loop between each of the plurality of access points and the central controller;
receiving in real-time, by the central controller, a plurality of Key Performance Indicators (KPIs) from each of the plurality of access points through the one or more user space applications via the lightweight communication protocol;
classifying in real-time, by the central controller, each of the plurality of access points into a set of administrative groups based on the plurality of KPIs, wherein each of the set of administrative groups comprises one or more access points;
dynamically creating a new administrative group comprising one or more access points of the wireless network communicatively coupled with the central controller, based on the plurality of KPIs corresponding to each of the one or more access points;
for an access point in each of the set of administrative groups,
generating, by the central controller, a set of awareness layers corresponding to the access point based on the plurality of KPIs through the one or more user space applications, wherein each of the set of awareness layers is a data representation corresponding to one or more of the plurality of KPIs, and wherein each of the set of awareness layers comprises comprehensive awareness information based on the one or more of the plurality of KPIs;
generating, by the central controller, a list of network driving actions corresponding to the access point based on the comprehensive awareness information of the set of awareness layers; and
determining, by the central controller, a list of guiding criteria associated with each of the list of network driving actions in a user comprehensible format through an Explainable Artificial Intelligence (XAI) model.

2. The method of claim 1, further comprising sending the generated list of network driving actions to the associated access point or to a selected group of associated access points.

3. The method of claim 1, further comprising:
sending feedback comprising the list of guiding criteria to the XAI model;
determining one or more user action options based on the feedback; and
rendering the one or more user action options on a Graphical User Interface (GUI).

4. The method of claim 1, further comprising dynamically adding or removing an access point from the plurality of access points to one of the set of administrative groups based on the plurality of KPIs corresponding to one of:
the access point, or
at least one access point from the one of the set of administrative groups.

5. The method of claim 1, wherein the set of awareness layers comprises a proprietary transmission awareness layer, an interferent transmission awareness layer, a traffic distribution fairness awareness layer, and a user experience awareness layer.

6. The method of claim 1, wherein generating a set of awareness layers corresponding to the access point comprises:
generating interactive data representations corresponding to the comprehensive awareness information of each of the set of administration groups; and
rendering each of the interactive data representations on a GUI.

7. The method of claim 1, further comprising:
computing secondary information based on the comprehensive awareness information from one or more of the set of awareness layers corresponding to each of the set of administration groups; and
automatically managing network behaviour of at least one of the set of administration groups through an interaction with the associated access point.

8. A system for managing a plurality of access points in a centralized wireless network, the system comprising:
a processor; and
a memory communicatively coupled to the processor, wherein the memory stores processor instructions, which when executed by the processor, cause the processor to:
install, by a central controller of the wireless network, one or more user space applications in each of the plurality of access points through a lightweight communication protocol, wherein the one or more user space applications are configured to establish a communication loop between each of the plurality of access points and the central controller;
receive in real-time, a plurality of Key Performance Indicators (KPIs) from each of the plurality of access points through the one or more user space applications via the lightweight communication protocol;
classify in real-time, each of the plurality of access points into a set of administrative groups based on the plurality of KPIs, wherein each of the set of administrative groups comprises one or more access points;
dynamically create a new administrative group comprising one or more access points of the wireless network communicatively coupled with a central node, based on the plurality of KPIs corresponding to each of the one or more access points;
for an access point in each of the set of administrative groups,
generate, a set of awareness layers corresponding to the access point based on the plurality of KPIs through the one or more user space applications, wherein each of the set of awareness layers is a data representation corresponding to one or more of the plurality of KPIs, and wherein each of the set of awareness layers comprises comprehensive awareness information based on the one or more of the plurality of KPIs;
generate a list of network driving actions corresponding to the access point based on the comprehensive awareness information of the set of awareness layers; and
determine a list of guiding criteria associated with each of the list of network driving actions in a user comprehensible format through an Explainable Artificial Intelligence (XAI) model.

9. The system of claim 8, wherein the processor instructions, when executed by the processor, further cause the processor to send the generated list of network driving actions to the associated access point or to a selected group of associated access points.

10. The system of claim 8, wherein the processor instructions, when executed by the processor, further cause the processor to:
   send feedback comprising the list of guiding criteria to the XAI model;
   determine one or more user action options based on the feedback; and
   render the one or more user action options on a Graphical User Interface (GUI).

11. The system of claim 8, wherein the processor instructions, when executed by the processor, further cause the processor to dynamically add or remove an access point from the plurality of access points to one of the set of administrative groups based on the plurality of KPIs corresponding to one of:
   the access point, or
   at least one access point from the one of the set of administrative groups.

12. The system of claim 8, wherein the set of awareness layers comprises a proprietary transmission awareness layer, an interferent transmission awareness layer, a traffic distribution fairness awareness layer, and a user experience awareness layer.

13. The system of claim 8, wherein to generate a set of awareness layers corresponding to the access point, the processor instructions, when executed by the processor, cause the processor to:
   generate interactive data representations corresponding to the comprehensive awareness information of each of the set of administration groups; and
   render each of the interactive data representations on a GUI.

14. The system of claim 8, wherein the processor instructions, when executed by the processor, cause the processor to:
   compute secondary information based on the comprehensive awareness information from one or more of the set of awareness layers corresponding to each of the set of administration groups; and
   automatically manage network behavior of at least one of the set of administration groups through an interaction with the associated access point.

15. A central controller of a wireless network for managing a plurality of access points in a centralized wireless network, the central controller configured for:
   installing one or more user space applications in each of the plurality of access points through a lightweight communication protocol, wherein the one or more user space applications are configured to establish a communication loop between each of the plurality of access points and the central controller;
   receiving in real-time, a plurality of Key Performance Indicators (KPIs) from each of the plurality of access points through the one or more user space applications via the lightweight communication protocol;
   classifying in real-time, each of the plurality of access points into a set of administrative groups based on the plurality of KPIs, wherein each of the set of administrative groups comprises one or more access points;
      dynamically create a new administrative group comprising one or more access points of the wireless network communicatively coupled with a central node, based on the plurality of KPIs corresponding to each of the one or more access points;
   for an access point in each of the set of administrative groups,
   generating a set of awareness layers corresponding to the access point based on the plurality of KPIs through the one or more user space applications, wherein each of the set of awareness layers is a data representation corresponding to one or more of the plurality of KPIs, and wherein each of the set of awareness layers comprises comprehensive awareness information based on the one or more of the plurality of KPIs;
   generating a list of network driving actions corresponding to the access point based on the comprehensive awareness information of the set of awareness layers; and
   determining a list of guiding criteria associated with each of the list of network driving actions in a user comprehensible format through an Explainable Artificial Intelligence (XAI) model.

16. The central controller of claim 15, further configured for sending the generated list of network driving actions to the associated access point or to a selected group of associated access points.

17. The central controller of claim 15, further configured for:
   sending feedback comprising the list of guiding criteria to the XAI model;
   determining one or more user action options based on the feedback; and
   rendering the one or more user action options on a Graphical User Interface (GUI).

18. The central controller of claim 15, further configured for dynamically adding or removing an access point from the plurality of access points to one of the set of administrative groups based on the plurality of KPIs corresponding to one of:
   the access point, or
   at least one access point from the one of the set of administrative groups.

\* \* \* \* \*